United States Patent
DePavia et al.

(10) Patent No.: US 8,456,166 B2
(45) Date of Patent: Jun. 4, 2013

(54) SINGLE-WELL THROUGH CASING INDUCTION LOGGING TOOL

(75) Inventors: Luis Eduard DePavia, Orinda, CA (US); Hong Zhang, El Sobrante, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 270 days.

(21) Appl. No.: 12/484,507

(22) Filed: Jun. 15, 2009

(65) Prior Publication Data

US 2010/0134113 A1 Jun. 3, 2010

Related U.S. Application Data (60) Provisional application No. 61/119,282, filed on Dec. 2, 2008.

(51) Int. Cl.
*G01V 3/18* (2006.01)
(52) U.S. Cl.
USPC ........... 324/338; 324/339; 324/340; 324/333; 324/346
(58) Field of Classification Search
USPC ........................................................ 324/339
See application file for complete search history.

(56) References Cited

U.S. PATENT DOCUMENTS

| | | | | |
|---|---|---|---|---|
| 4,730,162 A | * | 3/1988 | Vinegar et al. | 324/362 |
| 5,260,661 A | * | 11/1993 | Vail, III | 324/339 |
| 5,426,367 A | | 6/1995 | Martin et al. | |
| 5,491,668 A | * | 2/1996 | Priest | 367/35 |
| 5,905,379 A | * | 5/1999 | Orban et al. | 324/339 |
| 5,955,884 A | * | 9/1999 | Payton et al. | 324/339 |
| 6,294,917 B1 | * | 9/2001 | Nichols | 324/339 |
| 6,597,178 B1 | * | 7/2003 | Nichols et al. | 324/339 |
| 7,481,274 B2 | * | 1/2009 | Vinegar et al. | 166/302 |
| 2002/0105333 A1 | | 8/2002 | Amini | |
| 2004/0140811 A1 | * | 7/2004 | Conti | 324/338 |
| 2009/0195244 A1 | | 8/2009 | Mouget et al. | |
| 2009/0281731 A1 | | 11/2009 | Morrison et al. | |
| 2009/0302852 A1 | | 12/2009 | Levesque et al. | |

FOREIGN PATENT DOCUMENTS

| | | |
|---|---|---|
| EP | 1795920 A1 | 6/2007 |
| WO | 2009137287 A1 | 11/2009 |
| WO | 2009148815 A2 | 12/2009 |

OTHER PUBLICATIONS

International Preliminary Report on Patentability of PCT Application Serial No. PCT/US2009/064951, dated Jun. 7, 2011.

* cited by examiner

*Primary Examiner* — Jermele M Hollington
*Assistant Examiner* — Son Le
(74) *Attorney, Agent, or Firm* — Jeremy Berman; Darla Fonseca (57) ABSTRACT

Methods and related systems are described for making electromagnetic measurements of a subterranean rock formation through a conductive casing of a borehole. A number of transmitters/receivers are deployed into single well having a conductive casing. A magnetic field is induced through the conductive casing and into a surrounding subterranean rock formation, and the magnetic field is detected by the receivers. The receivers have main windings, feedback winding and bucking windings. One of the receiver coils in the tool string is excited at a time, and induced voltages at all of the other receiver coils, either in straight mode, or in feedback mode, are measured.

36 Claims, 9 Drawing Sheets

SINGLE-WELL THROUGH CASING INDUCTION LOGGING TOOL

CROSS REFERENCE TO RELATED APPLICATION

This patent application claims benefit of U.S. Provisional Patent Application Ser. No. 61/119,282, filed Dec. 2, 2008, which is incorporated by reference herein.

BACKGROUND

1. Field

This patent specification relates to electromagnetic measurements made in connection with boreholes. More particularly, this patent specification relates to methods and systems for single-well electromagnetic induction measurements through metallic casing.

2. Background

Formation resistivity (or conductivity) is a common measurement for hydrocarbon exploration/detection. A rock formation of given porosity has high conductivity when the pore space contains high brine saturation and low conductivity when the pore space contains hydrocarbons. By quantifying the porosity and resistivity, the hydrocarbon saturation can be estimated (Archies Law).

Downhole conductivity measurements on rock formations are made either by inductive means (a Transmitter coil inducing a current in the formation which in turn generates a secondary field sensed by a Receiver coil) or by ohmic/galvanic means (injecting a current through a couple of electrodes and measuring the Voltage developed across them).

Induction tools are used to measure conductivity of rock formations in Open Hole wells. Tools such as Schlumberger's AIT family and RT Scanner are employed for single-well logging, whereas the DeepLook-EM (Crosswell EM) tool is used to perform measurements between wells.

Schlumberger's DeepLook-EM tool in addition to Open Hole, also performs induction measurements through Casing by deploying a Transmitter string in one well and a Receiver string in another well and applying a casing correction method to remove the casing effects on the measurement.

Resistivity measurements through casing are difficult to make due to the high losses in the transmitted signal through casing and also due to the large casing imprint in the measured signal due to casing heterogeneous (non-uniform) properties (magnetic, conductive and thickness).

Cross-well electromagnetic surveys have been used in the past to map formation in-between two wells in oil-field environments. There are several papers in this area, For example, see the modeling studies described in B. R. Spies and T. M. Habashy, *Sensitivity analysis of crosswell electromagnetics*, Geophysics, Vol. 60, No. 3, P. 834-845 (1995); and David L. Alumbaugh and H. Frank Morrison, *Theoretical and practical considerations for crosswell electromagnetic tomography assuming a cylindrical geometry*, Geophysics,. Vol. 60, No. 3, 1995, P. 846-870, and an experimental study described in M. J. Wilt, D. L. Alumbaugh, H. F. Morrison, A. Becker, K. H. Lee and M. Deszcz-Pan, *Crosswell electromagnetic tomography: system design considerations and field results*, Geophysics, Vol. 60, No. 3, 1995, P. 871-885. More recently, regarding a new generation crosswell EM system, see Luis DePavia, Ping Zhang, David Alumbaugh, Cyrille Levesque, Hong Zhang and Richard Rosthal, *Next generation cross-well EM imaging tool*, SPE, 2008. It is often the case that at least one of the tool strings in a cross-well measurement application needs to be put into a metallic cased well for data collection within the depths of interest. The inhomogenieties of the well casings, both in thickness, diameters, and electromagnetic properties, make it challenging to remove these casing imprints on EM data in order to get high resolution inversion images. There are some references relating to casing imprints removal. For example, see U.S. Patent Publication No. 2011/0204896, and U.S. Patent Publication No. 2009-0281731 hereinafter referred to as "the '896 application" and "the '731 application" respectively, and both incorporated herein by reference.

The casing correction described in the '731 Patent Application involves using numerical modeling codes to calculate the casing attenuation and coil impedance to build up a look-up table, and then search for the corresponding metallic casing attenuation factor for the measured impedance at given frequencies.

Another tool developed by Schlumberger is the Electromagnetic Imaging Tool (EMIT) which uses induction methods in a single well to evaluate downhole metallic casing conditions by measuring EM thickness at multiple frequencies. U.S. Patent Publication No. 2009/0302852 (hereinafter "the '852 patent application, and incorporated by reference herein) discloses combining crosswell and surface to borehole (STB) surveys with EMIT surveys in magnetic and non-magnetic metallic casings, to remove casing imprints in crosswell data through EMIT measurements of casing thickness combined with numerical modeling calculations of casing attenuations. This method may also be useful for single well through casing induction logging tool.

In single-well through-casing induction-logging technology, the main challenges are how to remove casing imprints in logging data and extract formation information, and how to achieve useful range of depth of investigation. U.S. Pat. No. 5,426,367 is related to induction logging in cased wells.

SUMMARY

According to some embodiments, a system for making electromagnetic measurements in a borehole is provided. The system includes a downhole transmitter adapted to be deployed in a borehole having a conductive and/or magnetic casing and induce a magnetic field through the conductive and/or magnetic casing and into a surrounding subterranean rock formation; and a downhole receiver adapted to be deployed in the borehole at the same time as the transmitter, and to inductively detect the magnetic field in the rock formation through the conductive casing.

According to some embodiments, a method for making electromagnetic measurements in a borehole is provided. The method includes deploying a transmitter and receiver into a borehole having a conductive casing; inducing with the transmitter, a magnetic field through the conductive casing and into a surrounding subterranean rock formation; and detecting inductively with the receiver, the magnetic field in the rock formation through the conductive casing.

As used herein the terms transmitter and receiver both refer to transducers and in some embodiments the transmitter and receiver functions are performed by identical or substantially similar hardware. In other embodiments the transmitter and receiver functions are both carried out by the same coil but with different electrical circuits in the same transducer.

As used herein the term "transducer" means any device that converts one type of energy or physical attribute to another for various purposes including measurement or information transfer. As used herein, the term "transducer", or "transceivers" used in figure captions, thus includes electromagnetic sensors and/or receivers as well as transmitters.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein.

DETAILED DESCRIPTION OF THE PREFERRED EMBODIMENTS

In the following detailed description of the preferred embodiments, reference is made to accompanying drawings, which form a part hereof, and within which are shown by way of illustration specific embodiments by which the disclosure may be practiced. It is to be understood that other embodiments may be utilized and structural changes may be made without departing from the scope of the disclosure.

Formation resistivity evaluation behind metallic casings inside a borehole has been a challenging task for the induction method. This is due to the fact that electromagnetic waves are highly attenuated by very conductive and often magnetic casings. Recently, non-magnetic metallic casing, such as Chromium alloyed steel casing, became available, providing good opportunities to apply single well through casing induction tool technology in this potential market. The expansion of this technology will also have a big impact on the potentially large market of induction logging in a single well through magnetic Carbon steel casings.

The disclosed embodiments are related to single well electromagnetic induction logging in metallic cased wells, as well as to crosswell, surface-to-borehole electromagnetic surveys. For the single well application, according to some embodiments, means for formation evaluation through metallic casing is provided, within the depth of investigation of the specific tool design. This can be accomplished by using the receiver tool string in the existing crosswell system with excitations on the main winding of one of the receiver coils in the tool string at a time, and measure induced voltages at all of the other receiver coils, either in straight mode, or in feedback mode, or in any of the three bucking modes, while performing depth logs or station logs of the receiver tool string inside metallic cased wells. For casing correction purposes, the excitation can be alternated through all receivers in the tool string. For crosswell and surface-to-borehole applications, means are provided for measuring formation resistivity around metallic cased boreholes to provide a starting model for crosswell and/or surface to borehole data inversions.

Casing collars and casing centralizers add strong imprints in single well, as well as to crosswell and surface to borehole electromagnetic measurements, and it is challenging to remove these imprints in order to extract useful information of formation resistivity behind casing.

U.S. Patent Publication No. 2011/0204896 incorporated herein by reference, and hereinafter referred to as "the '4896 patent application") discloses obtaining receiver tool string depth logs inside metallic cased boreholes to identify casing collars and casing centralizers (CCID logs), and furthermore, to identify depth intervals where all of the receiver coils in the tool string are at casing sections without the presence of casing collars and casing centralizers. The receiver data at these depth intervals will be least affected by the inhomogeniedes of casing collar and casing centralizers. In the case of receiver in non-magnetic casing, e.g., the Chromium alloy steel casings, the casing correction is generally less challenging than the case where the data is strongly affected by magnetic casing collars and magnetic and/or very conductive casing centralizers.

There are four observations that form the basis of many of the disclosed embodiments. These observations are made in lab measurements with crosswell EM tools put inside Chromium steel casings and Carbon steel casings at the surface, with the presence of given type of casing collars and casing centralizers. The four observations are described as following:

1. When the feedback coil is driven by a periodic excitation, it is possible to perform measurements of the first harmonic response of the receiver main winding voltage induced by this excitation, or trans-impedance between feedback winding and main winding, at various frequencies in a typical crosswell EM tool.

2. When the center of a receiver coil is placed at the center of a casing collar, or a casing centralizer, the frequency response of the above measurement is unique. By performing measurements at multiple frequencies, it is possible to identify and distinguish between casing collars and casing centralizers.

3. It is possible to perform receiver depth logs with the above measurement at fixed frequencies in typical crosswell EM tool system. The noise introduced by the motion of receiver during logging is much less than the signal level, especially at higher frequencies.

4. In a magnetic steel casing, with the drive on receiver main winding, the induced voltages at adjacent receivers in the tool string are larger than with the drive on the feedback winding.

Many of the disclosed embodiments reduce the complexities in dealing with steel casing influences on electromagnetic receivers and/or magnetic transmitters, or avoid dealing with the complexities of conductive and/or magnetic objects in non-magnetic steel casings, such as casing collars and centralizers in Chromium steel cased sections.

Figure 1:
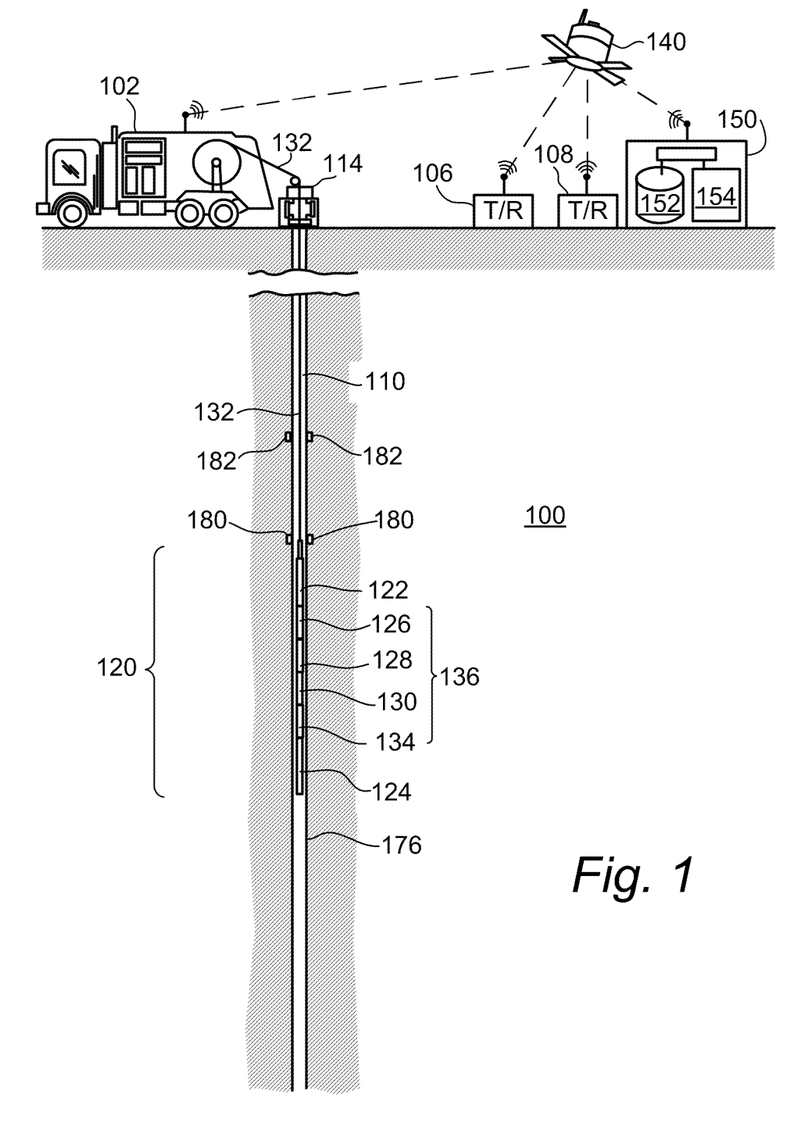
FIG. 1 is a schematic showing an electromagnetic induction survey system in accordance with embodiments of the present disclosure.

FIG. 1 is a schematic showing an electromagnetic induction survey system in accordance with embodiments of the present disclosure. Borehole 110 is in subterranean formation 100. Wireline toolstring 120 is deployed in borehole 110 from wireline truck 102 using cable 132 via wellhead 114. Borehole 110 is shown cased with casing 176 in the vicinity of toolstring 120. Surface station SS is located inside Truck 102 communicate with other surface components and systems via communication with satellite 140 or other known wireless or wired means. Toolstring 120 includes several components, such as transceiver section 136 which includes four receivers 126, 128, 130 and 134. Toolstring 120 also includes other tool and/or modules 122 and 124. According to some embodiments, surface transmitters and/or receivers 106 and 108 are used instead of, or in addition to any of the downhole receivers when performing surface-to-borehole or borehole-to-surface electromagnetic induction surveys. According to some embodiments, processing system 150 is connected to the SS, and is used to process the measured data. System 150 includes one or more processors 154 and a storage system 152 that can include various types of storage including volatile memory such as primary random access memory, and non-volatile memory such as read-only memory, flash memory, magnetic computer storage devices such as hard disks, floppy disks, and magnetic tape, and optical discs such as CD ROMS, DVD ROMS. According to some embodiments, a processing system such as processing system 150 is incorporated into the SS.

Deep sensing induction tools such as one or more of the receivers in transceiver section 136 on toolstring 120 broadcast an electromagnetic field into a conductive media including formation 100 and measure the attenuation and phase shift of the electromagnetic field at one or more receiver coils such as receivers 126, 128, 130 and 124 in toolstring 120. The positions of the receivers are then changed throughout a whole reservoir region within formation 100, as well as above and below the reservoir, to provide a set of magnetic field measurements, including amplitude and phase, that have sensitivity to various spatial positions within the reservoir. The data are then processed in processing system 150 (or in the SS) and inverted to provide data without the casing imprints when the receivers 126, 128, 130 and 134 are inside a conductive and/or magnetic casing such that the data 'look' like open hole data. A resistivity distribution around the borehole 110 can then be inverted from the corrected data.

While the use of a wireline unit is primarily shown in FIG. 1, according to other embodiments the techniques described herein are practiced using permanent transmitters such as transmitters 182 and/or permanent receivers such as receivers 180 in the well or using sensors deployed while drilling. Although only two transmitters 182 and two receivers 180 are shown in FIG. 1, in practice and depending on the application, larger numbers of transmitters and/or receivers can be deployed. According to some embodiments, multiple transceivers located at the same depth are azimuthally distributed symmetrically around the casing axis. For further detail on permanent electromagnetic measurement systems, see U.S. Pat. No. 6,534,986 which is incorporated herein by reference.

Figure 2A:
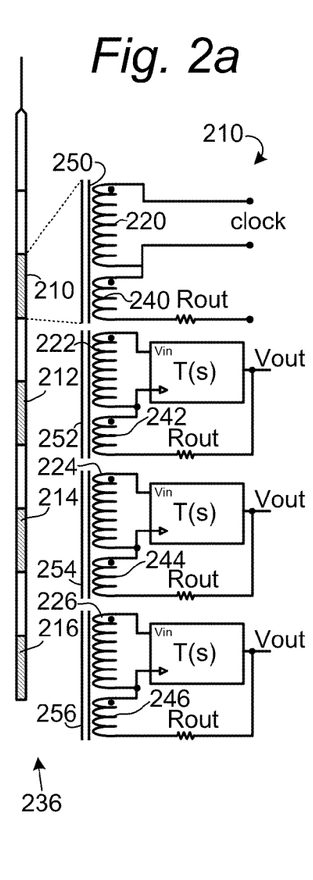
FIGS. 2a, 2b, 2c and 2d show further detail of a transceiver section in feedback mode, according to some embodiments.
Figure 2B:
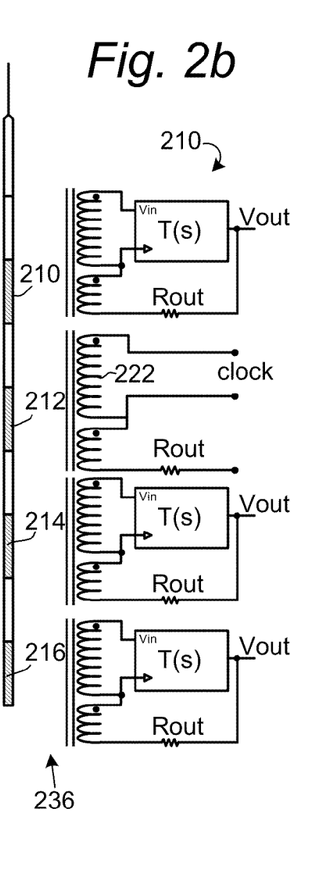
Figure 2C:
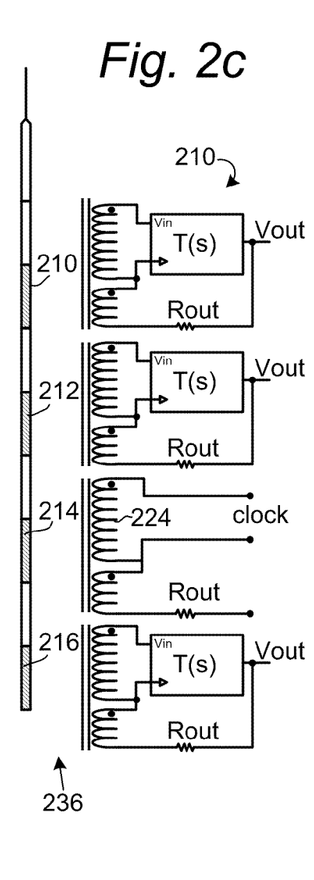
Figure 2D:
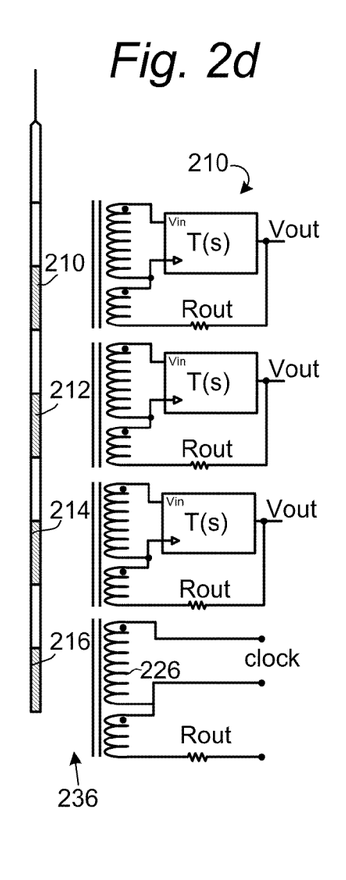

FIGS. 2a, 2b, 2c and 2d show further detail of a transceiver section, according to some embodiments. A specially designed transmitter/receiver (or transceiver) tool string 236 consists of multiple receiver coils 210, 212, 214 and 216. Although four transceivers are shown in this example, in practice other numbers of transceivers can be used. For example, according to one embodiment, three receivers are used instead of four. Each of the receiver coils 210, 212, 214 and 216 consists of a main winding 220, 222, 224 and 226, respectively, and a feedback winding 240, 242, 244 and 246, respectively, wound around either a magnetic core, or a non-conductive non-magnetic core, e.g., an air core 250, 252, 254 and 256, respectively. When the main winding on one of the receivers, for example main winding 220 of receiver 210, is excited at a given frequency, the voltages at other receivers, for example receivers 212, 214 and 216 in the tool string 236 can be measured in feedback mode. The frequency of excitations on the main winding can be changed, and the drive voltage and current in the main winding can be monitored in order to normalize the measured voltages on other receivers in the tool string. In the case of FIGS. 2a-d, the receivers are listening in feedback mode. The excitation on the main winding can be alternated among all of the receivers in the tool string 236, as indicated in FIG. 20a-d for receivers in feedback mode. For example, in FIG. 2a, main winding 220 of receiver 210 is being excited while receivers 212, 214 and 216 are listening in feedback mode. In FIG. 2b, main winding 222 of receiver 212 is being excited while receivers 210, 214 and 216 are listening in feedback mode. In FIG. 2c, main winding 224 of receiver 214 is being excited while receivers 210, 212 and 216 are listening in feedback mode. Finally, in FIG. 2d, main winding 226 of receiver 216 is being excited while receivers 210, 212 and 214 are listening in feedback mode. The dimension of a receiver in the direction of the tool axis is generally greater than 1 meter. According to some embodiments, the spacing between each adjacent receiver will depend on the dimensions of the receiver core and windings, and is more than about 4 meters so that the receivers are in the far-field region of the transmitter. In general, the transceiver spacing and the frequencies used will depend on the casing properties including the electric conductivity of the casing and diameter of the casing.

Figure 3A:
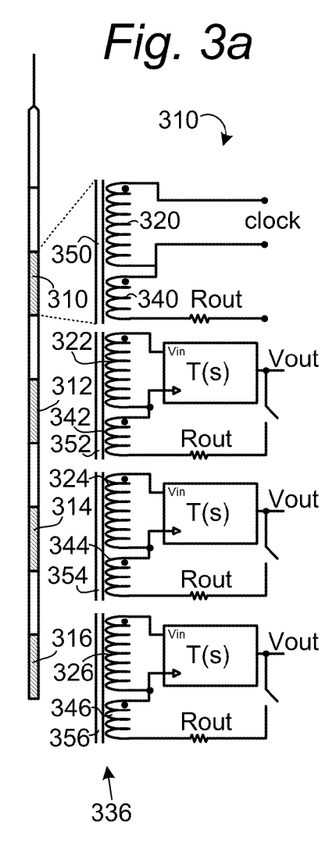
FIGS. 3a, 3b, 3c and 3d show further detail of a transceiver section in straight mode, according to some embodiments.
Figure 3B:
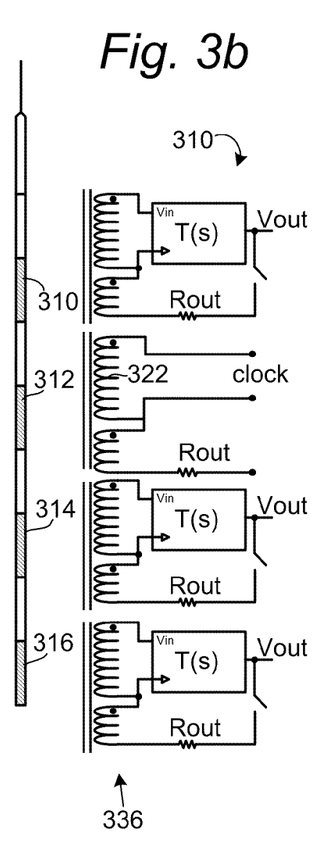
Figure 3C:
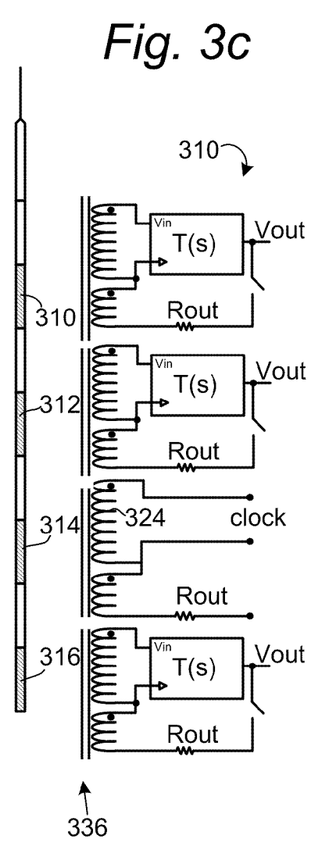
Figure 3D:
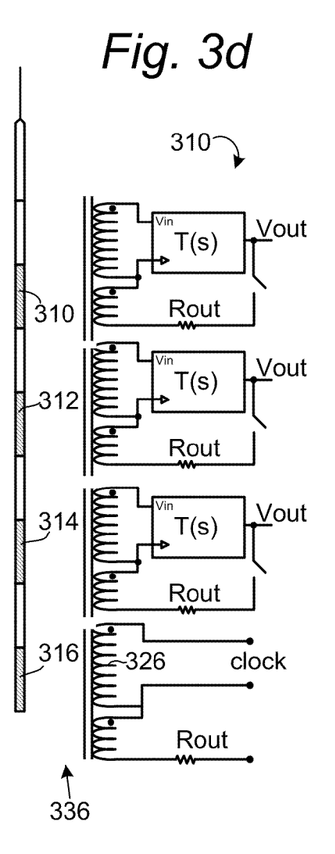

FIGS. 3a, 3b, 3c and 3d show further detail of a transceiver section, according to some embodiments. A specially designed receiver tool string 336 consists of multiple receiver coils 310, 312, 314 and 316. Each of the receiver coils 310, 312, 314 and 316 consists of a main winding 320, 322, 324 and 326, respectively, and a feedback winding 340, 342, 344 and 346, respectively, wound around either a magnetic core, or a non-conductive non-magnetic core, e.g., an air core, 350, 352, 354 and 356, respectively. In the case of FIGS. 3a-d, the receivers are listening in straight mode. The excitation on the main winding can be alternated among all of the receivers in the tool string 336, as indicated in FIG. 3a-d for receivers in straight mode. For example, in FIG. 3a, main winding 320 of receiver 310 is being excited while receivers 312, 314 and 316 are listening in straight mode. In FIG. 3b, main winding 322 of receiver 312 is being excited while receivers 310, 314 and 316 are listening in straight mode. In FIG. 3c, main winding 324 of receiver 314 is being excited while receivers 310, 312 and 316 are listening in straight mode. Finally, in FIG. 3d, main winding 326 of receiver 316 is being excited while receivers 310, 312 and 314 are listening in straight mode.

According to some embodiments the receiver string is placed inside a metallic cased borehole and run depth logs with the measurements described with respect to FIGS. 2a-d and 3a-d. Since the drive is on one of the receiver main windings in the tool string at a time, the voltage measured in all of the other receiver coils in the tool string, either in straight mode (as in FIGS. 3a-d) or in feedback mode (as in FIGS. 2a-d), can be used to extract formation information after corrections for casing effect. The depth log of receiver running, in this mode will be performed at multiple frequencies, and the depth of investigation of the log depends on the type of metallic casing in the borehole, the operation frequencies and the separation between receivers in the tool string. The location of the excited receiver alternates through the entire tool string, so that the casing effects on the data can be taken out using similar method as described in the '913 patent application, and the '896 patent application.

According to other embodiments, the principle of a bucking coil in the receiver tool string is used to cancel out the primary field generated by the active receiver main winding in free space, and therefore to enhance the sensitivity to the formation, similar to the case of AIT tool developed by Schlumberger in 1980's. However, due to the fact that through metallic casing tools operate at lower frequencies, the length of the coil is longer for higher sensitivity, and the separations between the receivers are larger in order to satisfy the far-field criterion inside metallic casings, the detailed designs of the bucking coil will be different. As an example, bucking modes of the receivers can be implemented as described in the following, and as shown in FIG. 4 through FIG. 6.

To achieve different vertical resolutions and depths of investigation, there can be at least three bucking modes that can be run at multiple frequencies in a four-receiver string for example. The number of bucking modes will increase with increased number of receivers in the tool string. Following are descriptions of the three bucking modes in a four-receiver tool string.

Figure 4:
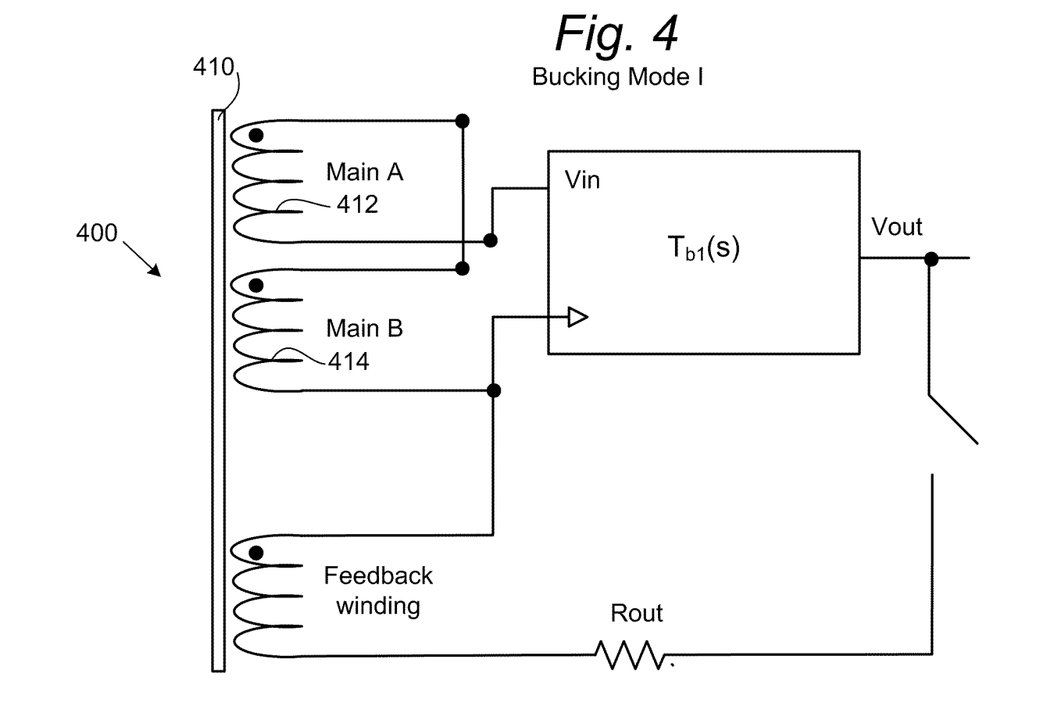
FIG. 4 show a single receiver connected in a first bucking mode (I), according to some embodiments.

FIG. 4 shows a single receiver connected in a first bucking mode, according to some embodiments. A first bucking mode (bucking mode I) for shallowest depth of investigation is within one receiver coil 400, where the two halves of the main winding, Main A winding 412, and Main B winding 414, are connected in opposite polarity, as shown wound around core 410. This can be done in connection with current tools such as Schlumberger's DeepLookEM receiver sonde, by modifying the analog signal conditioning circuit.

Figure 5:
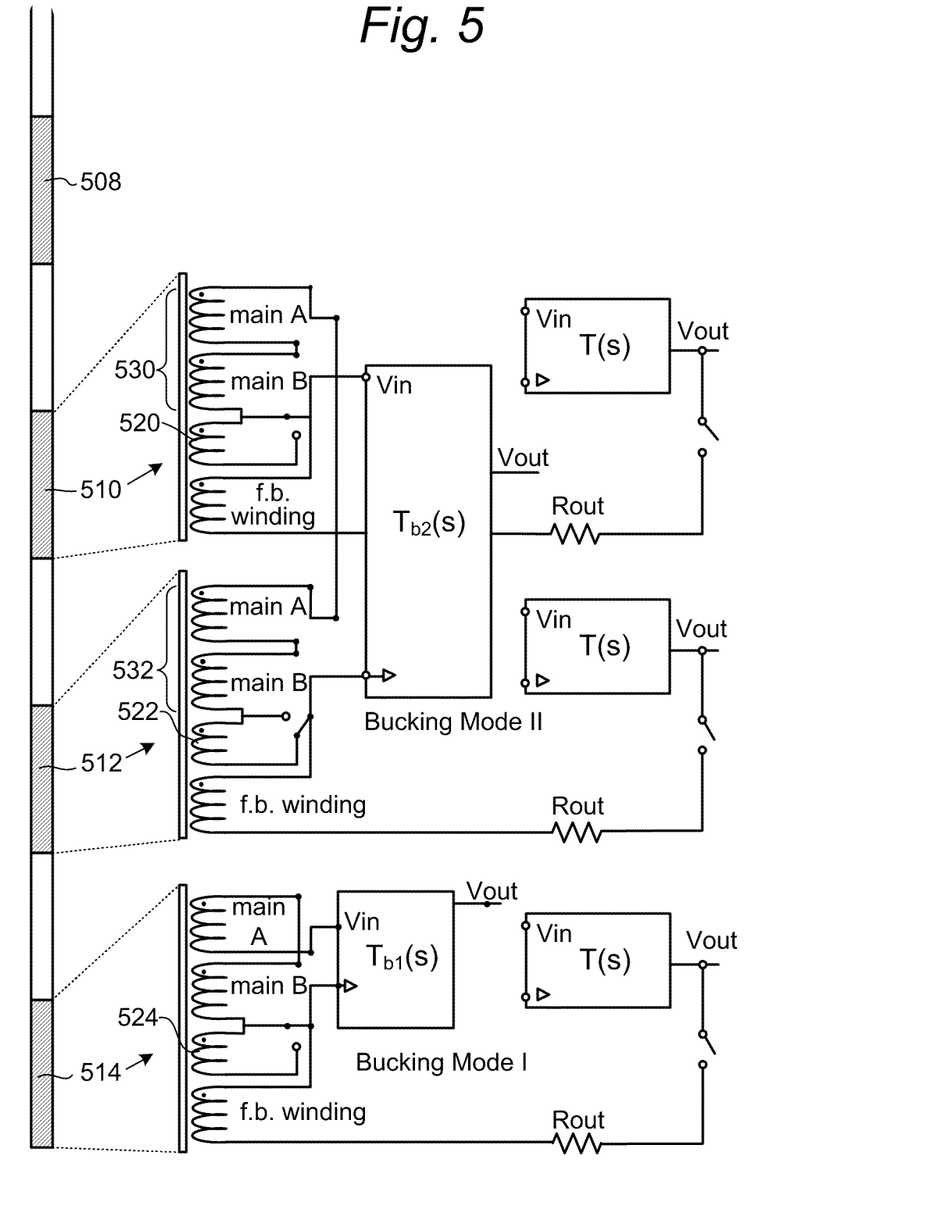
FIG. 5 shows a single-well through casing resistivity logging tool with an arrangement of receiver coils connected in a second bucking mode (II), according to some embodiments.
Figure 6:
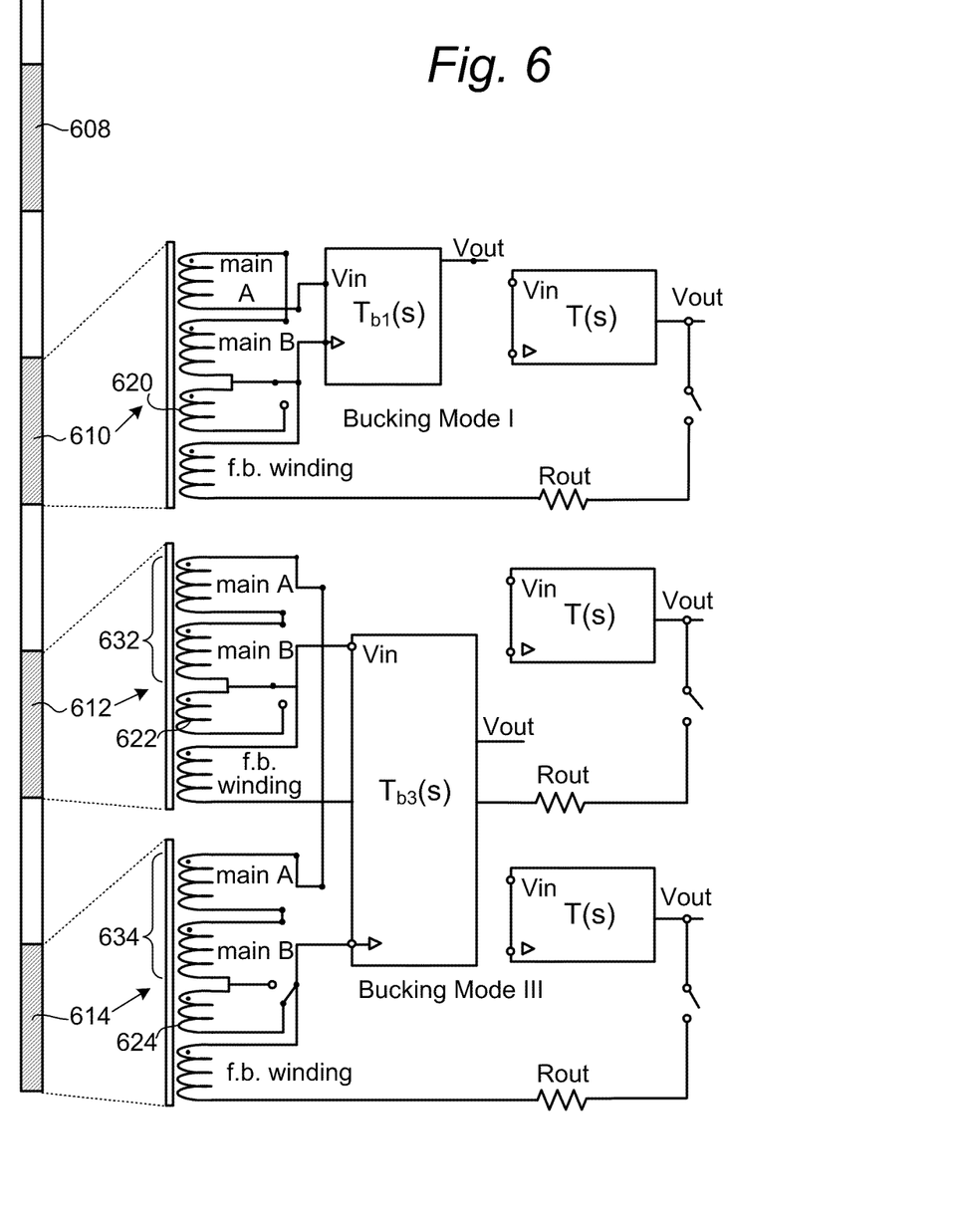
FIG. 6 shows a single-well through casing resistivity logging tool with an arrangement of receiver coils connected in a third bucking mode (III), according to some embodiments.

FIG. 5 shows a single-well through casing resistivity logging tool with an arrangement of receiver coils connected in a second bucking mode, according to some embodiments. A second bucking mode (bucking mode II) is for mid-range depth of investigation, and can be performed within two receiver coils that are adjacent to the receiver that has excitations on the main winding (i.e. active receiver). For example, when receiver 508 is active, the bucking is implemented between receivers 510 and 512. This arrangement requires an additional "bucking winding" to the existing receiver designs. For example, in receivers 510, 512 and 514 the bucking winding is winding 520, 522 and 524 respectively. In normal receiver modes (feedback and straight) the additional bucking winding is not in use when the system is operating in the single-well through casing configuration as described in FIGS. 2a-d and 3a-d. For example, while the receiver 508 main winding is driven, the main winding 530 of receiver 510 can be connected to the main winding 532 of receiver 512 with the additional turns (bucking winding 522) in opposite polarity. The number of turns in bucking windings 520, 522 and 524 depends on the separation between the receivers in the tool string, such that the primary field from receiver 508 is canceled in the receiver 510 plus receiver 512 bucking mode in free space. Similarly, as the excitation on main winding alternates to other receivers in the tool string, different combinations of the two adjacent receivers can also be operated in bucking mode II. At the mean time receiver 512 can be run in bucking mode I.

FIG. 6 shows a single-well through casing resistivity logging tool with an arrangement of receiver coils connected in a third bucking mode, according to some embodiments. The third bucking mode (bucking mode III) for the deepest depth of investigation is within two receiver coils that are further away from the one that has excitations on the main winding (active receiver, or transceiver). For example, when receiver 608 is active, the bucking is between receiver 612 and receiver 614. This will use the same "bucking winding" as described above with respect to FIG. 5. The bucking windings are windings 620, 622 and 624. The main winding 632 of receiver 612 is connected to the main winding 634 plus the bucking winding 624 of receiver 614 in opposite polarity, and the total response of receiver 612 plus receiver 614 to the active receiver 608 in free space will be zero. In the mean time, receiver 610 is running in bucking mode I. FIG. 6 shows this configuration. Note that the analog signal conditioning circuit $T_{b3}(s)$ for bucking mode III is slightly different from that of $T_{b2}(s)$ for bucking mode II. The bucking can be adjusted not only through the number of turns in bucking winding for a given separation between receivers, it can also be further "zeroed" through dynamic gains of the analog circuit, since it would be very difficult in reality to do sensor alignments due to the difficulties of dealing with large separations between long receiver coils.

Similar to the case in the embodiments described with respect to FIGS. 2a-d and 3a-d, the active receiver position can be alternated throughout the receiver toolstring and therefore result in different combinations of the three bucking modes of the embodiments described with respect to FIGS. 4, 5 and 6.

Figure 7:
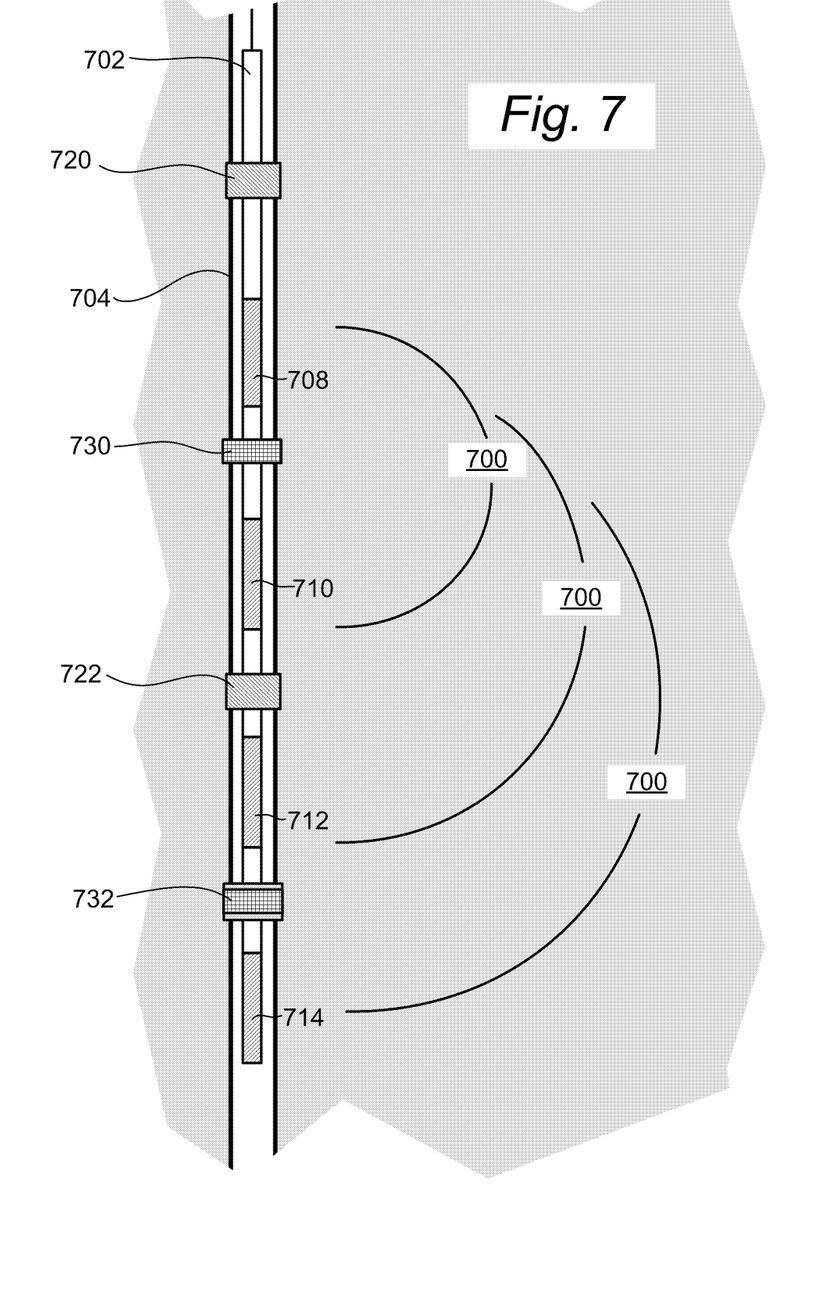
FIG. 7 shows a single-well through casing resistivity logging tool, according to some embodiments.

FIG. 7 shows a single-well through casing resistivity logging tool, according to some embodiments. Toolstring 702 is shown deployed in a wellbore having conductive casing 704 and formed within subterranean rock formation 700. Casing 704 includes casing collars 720 and 722, as well as casing centralizers 730 and 732. The main winding of the receiver coil 708 is driven and the other three receivers 710, 712 and 714 are listening in either straight mode, feedback mode, or combinations of the three bucking modes, as described with respect to FIGS. 2a-d, 3a-d, or FIGS. 5 and 6. Note that toolstring 702 is positioned within casing 704 such that the data are depth-sampled using depth intervals where no casing collar and casing centralizers are present using separate CCID logs as described herein below.

According to some embodiments, receiver CCID logs are used at multiple frequencies, to identify depth intervals where all of the receivers in the tool string are in relatively uniform sections of casing without the presence of casing collar and casing centralizers which are the dominant imprints on the logging data. These depth intervals are then used to depth-sample the data collected during the EM induction surveys so that no casing collar and casing centralizers imprints will be found in the re-sampled data set, as illustrated in FIG. 7.

According to some embodiments, the disclosed arrangements and techniques can also be combined with the cross-well and/or surface to borehole surveys in cases where a well log is required for starting model and inversion constraints. According to yet further embodiments, for applications where better vertical resolutions are required, shorter coils and smaller receiver coil separations may be used, with or without a magnetic core.

According to another embodiment, an induction tool and a method is provided that enables measuring formation conductivity through casing in a single well. The measurement is made with an ultra-sensitive induction magnetometer featuring a main coil and a feedback coil (such as a DeepLook-EM receiver). The receiver feedback coil is excited instantaneously with an electrical transient (or a pulse) and the receiver main coil response is measured. The transient response of the system in time domain is a function of the impedance of the receiver main coil which in turn is a function of the casing properties and the rock formation conductivity. According to other embodiments, the main winding on one of the transceivers in the tool string is driven instantaneously with an electrical transient (or a low frequency periodic clock) and the transient response measured in time domain using the remaining transceivers in the tool string are functions of the casing properties and the rock formation conductivity.

Chromium casing is non-magnetic, has uniform thickness, electrical conductivity and corrosion resistance. Therefore, in cases where Chromium casings are used, after the non-uniform sections (casing collars and casing centralizers) are identified, and those sections removed (or corrected) form the survey data, the remaining changes in the depth log data taking place in the uniform section of casing, are due to the formation resistivity changes behind casing.

Figure 8:
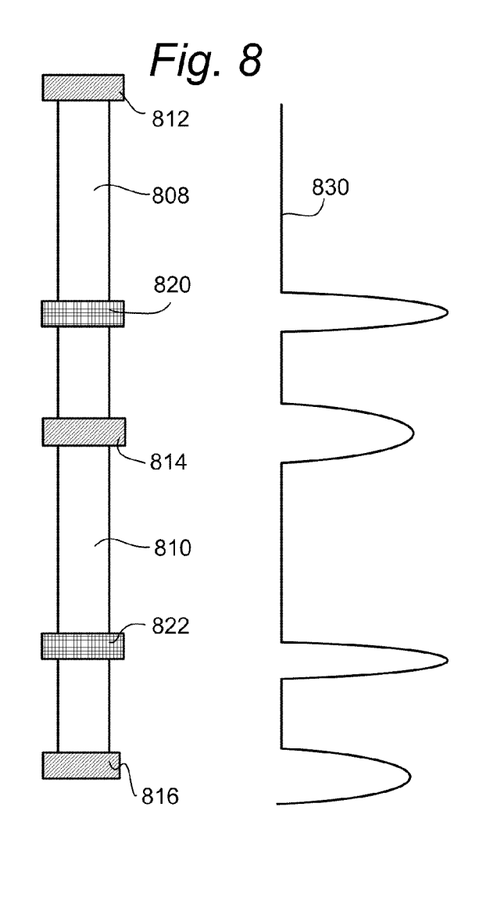
FIG. 8 is a diagram showing a length of casing with collars and centralizers in air and an associated receiver response.

FIG. 8 is a diagram showing a length of casing with collars and centralizers in air and an associated receiver response. The Chromium casing has two Chromium casing joints 808 and 810 with three collars 812, 814 and 816, as well as two casing centralizers 820 and 822. Note that casing 810 is suspended in air. The trace 830 represents the amplitude in a receiver transient response. The trace 830 shows a clear change in the amplitude of transient response to the centralizer and collars with a characteristic signature. Notice that the transient response in the uniform section of chromium casing is a constant when the casing is in air or very high resistivity.

Figure 9:
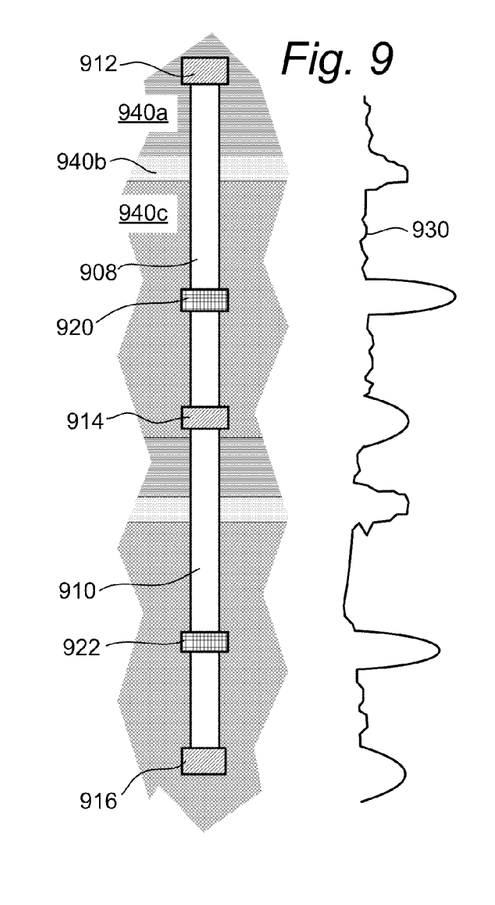
FIG. 9 is a diagram showing a length of casing with joints and collars in a subterranean rock formation having different resistivity layers, and an associated receiver response.

FIG. 9 is a diagram showing a length of casing with joints and collars in a subterranean rock formation having different resistivity layers, and an associated receiver response. The Chromium casing has two Chromium casing joints 908 and 910 with three collars 912, 914 and 916, as well as two casing centralizers 920 and 922. The casing is positioned in a rock formation with different resistivity layers, for example layers 940*a*, 940*b* and 940*c*. Trace 930 represents the amplitude in the receiver transient response. Notice that in the uniform section of casing, the transient response amplitude correlates with the resistivity of the formation through casing. The Centralizers and Collar sections can be removed since their response is identifiable.

Figure 10:
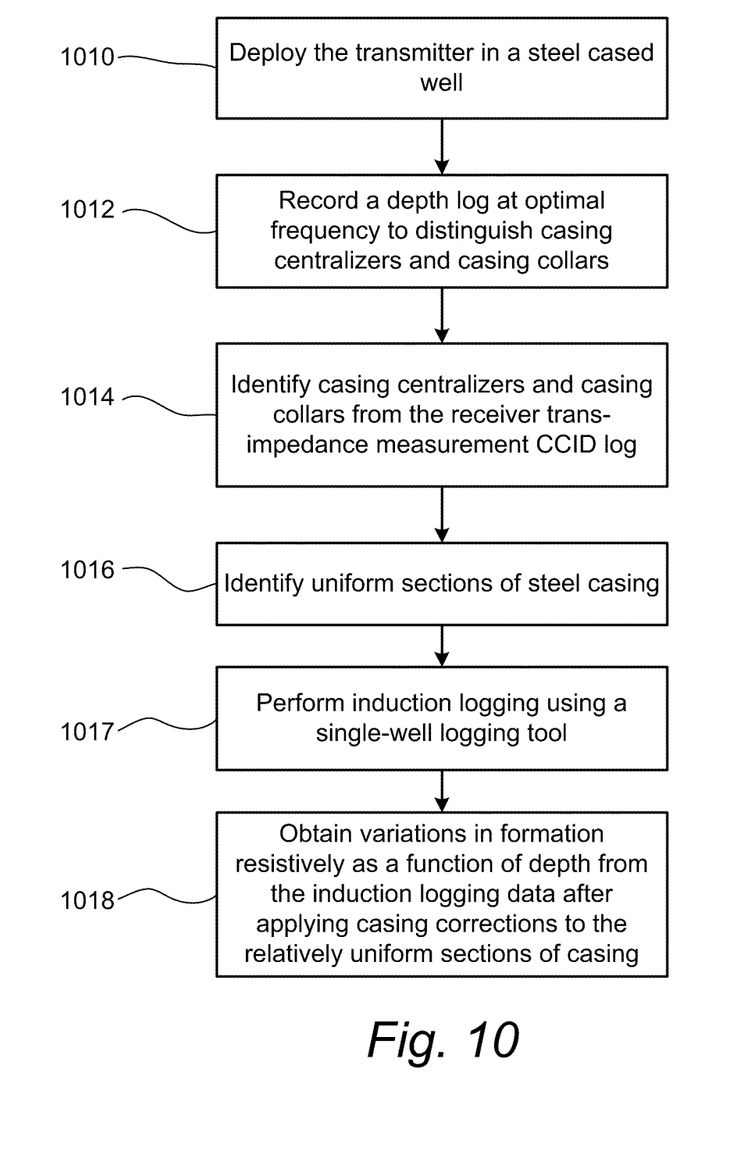
FIG. 10 is a flow chart showing steps involved in operating a single well induction resistivity logging tool through metallic casing, according to some embodiments.

FIG. 10 is a flow chart showing steps involved in operating a single well induction resistivity logging tool through metallic casing, according to some embodiments. In step 1010, the (transceiver) tool string is deployed in a cased well with metallic casings. In step 1012, a depth log is recorded at the frequency determined to be optimal to distinguish casing centralizers and casing collars. The higher the frequency, the more localized the effect of those sections are. In step 1014 casing centralizers and casing collars are indentified from the CCID log. In step 1016 relatively uniform sections of metallic casing are identified. In step 1017, induction logging is performed using the various embodiments of a single-well logging tool (i.e., a transmitter with the adjacent receivers in feedback mode, or in straight mode, or in combinations of the three bucking modes) In step 1018, the variations in resistivity as a function of depth will be obtained from the induction logging data after applying casing corrections to the relatively uniform sections of casing.

According to other embodiments, a tool with separate transmitter and receiver coil is provided. Traditional induction tools used in open hole logging feature a transmitter coil and at least two separate receiver coils. This arrangement is also applicable for a single tool through casing provided (a) the tool is designed to operate at transmitter power level and frequency ranges which will enable the signal to go through casing and, (b) the non-uniform sections of casing (casing collars and casing centralizers) are identified and compensated for. The remaining resistivity measurement (in the relatively uniform sections of casing) will represent that of the formation resistivity after applying some casing correction algorithms, as referred to herein above, to the logging data. For example, see the '913 application, and the '089 application.

According to some embodiment an apparatus is provided that consists of multiple receiver coils, each of the coils consists of a main winding and a feedback winding wound on either a magnetic core, or a non-conductive and non magnetic core. Excitations at multiple frequencies can be applied to the main winding on one of the receiver coils at a time while receiver voltages on other receiver coils can be measured either in straight mode or in feedback mode.

A method is provided to use the above apparatus to perform single well through casing induction logging inside metallic cased wells. The metallic casing can be either non-magnetic (e.g. Chromium alloyed steel), or magnetic (e.g., Carbon steel). The formation information can be extracted in a similar way as in Schlumberger's GeoBILT and AIT tool families after casing imprints are removed.

According to some embodiments, an apparatus is provided that consists of multiple receiver coils, each of the coils consists of a main winding, a bucking winding, and a feedback winding wound on either a magnetic core, or a non-conductive and non magnetic core. Excitations at multiple frequencies can be applied to the main winding on ONE of the receiver coils at a time while receiver voltages on other receiver coils can be measured either in bucking mode I or bucking mode II as described herein.

According to some embodiments, a method is provided to use the above described apparatus to perform single well through casing induction logging inside metallic cased wells. The metallic casing can be either non-magnetic (e.g. Chromium alloyed steel), or magnetic (e.g., Carbon steel). The formation information can be extracted in a similar way as in Schlumberger's AIT family tools after casing imprints are removed.

According to some embodiments, a method is provided that can be used to interpret the well logging data described above. Separate CCID logs using the same tool string can be used to define depth intervals where all of the receiver coils are located within relatively uniform sections of casing. These depth intervals are then applied to re-sample the induction logging data to minimize the casing imprints from casing collars and casing centralizers.

According to some embodiments, a method is provided that can be used to improve the interpretation of the single well through casing induction logging data in non-magnetic metallic casing. Casing attenuation can be calculated using numerical modeling codes, with specific tool design parameters combined with other casing correction methods. After applying the correction of casing attenuations, the data can be processed as openhole induction logging data.

According to some embodiments, with the designs of the receiver coil described herein, the same receiver tool string can be used for either single-well through metallic casing induction logging, or cross-well/surface to borehole logging. It is therefore possible to provide self-contained services for cross-well and surface to borehole surveys with known and up to date well logs for constructing starting models and image inversion constrains. Since using well logs that were obtained when the well was drilled may have ubiquities on whether the condition has changed or not in a matured field, the self-contained services will improve the quality of inverted images of cross-well and surface to borehole surveys.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting. Further, the disclosure has been described with reference to particular preferred embodiments, but variations within the spirit and scope of the disclosure will occur to those skilled in the art. It is noted that the foregoing examples have been provided merely for the purpose of explanation and are in no way to be construed as limiting of the present disclosure. While the present disclosure has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present disclosure in its aspects. Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A downhole tool system for making electromagnetic measurements in a borehole comprising:
    a first downhole transceiver adapted to be deployed in a borehole having a conductive casing comprising at least a uniform section and non-uniform section and induce a magnetic field through the conductive casing and into a surrounding subterranean rock formation;
    a second downhole transceiver adapted to be deployed in the borehole at the same time as the first downhole transceiver, and to inductively detect the magnetic field in the rock formation through the conductive casing;
    means for operating the first downhole transceiver at a plurality of frequencies;
    means for detecting response of the second transceiver at each of the plurality of frequencies;
    data processing means in signal communication with the means for detecting and adapted to identify the uniform and non-uniform sections of the conductive casing based on the amplitude of the magnetic field detected by the second downhole transceiver, and estimate the formation resistivity based on the magnetic field in the rock formation through the uniform sections of the conductive casing;
    wherein each of the non-uniform sections of conductive casing comprise at least one centralizer and at least one casing collar, the data processing means for identifying the at least one casing collar and the at least one centralizer based on a frequency response of the magnetic field in the non-uniform sections.

2. A system according to claim 1 wherein the first and second downhole transceivers are adapted to be mounted on a single toolstring when deployed in the borehole.

3. A system according to claim 1 further comprising one or more processors adapted and programmed to measure and substantially remove the effect of the casing on the magnetic field as measured by the second transceiver.

4. A system according to claim 1 further comprising one or more processors adapted and programmed to estimate a casing attenuation factor using numerical modeling code, tool parameters, and casing parameters.

5. A system according to claim 1 wherein measurements made by the second transceiver are primarily in the frequency domain.

6. A system according to claim 1 further comprising a third transceiver and a fourth transceiver, both adapted to be deployed in the borehole at the same time as the first transceiver, and to inductively detect the magnetic field in the rock formation through the conductive casing.

7. A system according to claim 6 wherein the first, second, third and fourth transceivers are all adapted to both induce and inductively detect a magnetic field through the conductive casing in a surrounding subterranean rock formation.

8. A system according to claim 1 wherein the first, second, third and fourth transceivers each includes a main winding and a feedback winding.

9. A system according to claim 8 wherein the first, second, third and fourth transceivers each further include a bucking winding.

10. A system according to claim 8 wherein the main winding and feedback windings are each wound around a magnetic core.

11. A system according to claim 8 wherein excitations at multiple frequencies can be applied to the main winding of one of the first, second, third and fourth transceiver, while voltages on the windings of the others are measured.

12. A system according to claim 1 wherein in the conductive casing is non-magnetic.

13. A system according to claim 12 wherein the conductive casing is a Chromium alloyed steel casing.

14. A system according to claim 1 wherein the casing is substantially magnetic.

15. A system according to claim 1 wherein the first transceiver is adapted to induce the magnetic field primarily at frequencies less than about 1 KHz.

16. A system according to claim 8 wherein the first transceiver is adapted to induce the magnetic field primarily at frequencies less than about 500 Hz.

17. A system according to claim 1 wherein the first and second transceivers when deployed are adapted to be separated by a distance of greater than about 1 meter.

18. A system according to claim 17 wherein the first and second transceivers when deployed are adapted to be separated by a distance of greater than about 4 meters.

19. A system according to claim 1 wherein the first and second transceivers are located at substantially the same position along the axis of the borehole when deployed.

20. A system according to claim 1 wherein time domain data is measured and recorded based at least in part on the detections made with the second transceiver.

21. A method for making electromagnetic measurements in a borehole comprising:
    deploying a first transceiver and a second transceiver into a borehole having a conductive casing comprising at least a uniform section and non-uniform section;
    inducing with the first transceiver, a magnetic field through the conductive casing and into a surrounding subterranean rock formation, the inducing performed at a plurality of frequencies;
    detecting inductively with the second transceiver, the magnetic field in the rock formation through the conductive casing
    identifying the uniform and non-uniform sections of the conductive casing based on the amplitude of the magnetic field detected by the second downhole transceiver,
    identifying at least one casing collar and at least one centralizer based on a frequency response of the magnetic field in the non-uniform sections; and
    estimating the formation resistivity based on the magnetic field in the rock formation through the uniform sections of the conductive casing.

22. A method according to claim 21 wherein the first and second transceivers when deployed are mounted on a single toolstring.

23. A method according to claim 21 further comprising measuring and substantially removing the effect of the casing on the magnetic field as measured by the second transceiver.

24. A method according to claim 21 further comprising estimating a casing attenuation factor using numerical modeling code, tool parameters, and casing parameters.

25. A method according to claim 21 wherein measurements detected by the second transceiver are primarily in the frequency domain.

26. A method according to claim 21 further comprising:
deploying a third transceiver and a fourth transceiver in the borehole; and
detecting inductively with the third and fourth transceivers, the magnetic field in the rock formation through the conductive casing.

27. A method according to claim 21 wherein the first, second, third and fourth transceivers each includes a main winding and a feedback winding.

28. A method according to claim 27 wherein the first, second, third and fourth transceivers each further include a bucking winding.

29. A method according to claim 27 wherein the main winding and feedback windings are each wound around a magnetic core.

30. A method according to claim 27 wherein the inducing includes exciting at multiple frequencies the main winding of the first transceiver, and the detecting includes measuring voltages on the windings of the second, third and fourth transceivers.

31. A method according to claim 26 further comprising
inducing with the second transceiver, a magnetic field through the conductive casing and into a surrounding subterranean rock formation; and
detecting inductively with the first, third and fourth transceivers, the magnetic field in the rock formation through the conductive casing.

32. A method according to claim 31 further comprising alternating which of the first, second, third and fourth transceivers induce a magnetic field such that different separations are obtained between the positions of inducing and detection of the magnetic field.

33. A method according to claim 32 further comprising substantially removing coupling effects between the first, second, third and fourth transceivers.

34. A method according to claim 21 further comprising minimizing the effect of casing collars and casing centralizers based at least in part on separate measurements made in the borehole.

35. A method according to claim 21 wherein the inducing of the magnetic field primarily uses frequencies less than about 1KHz.

36. A method according to claim 21 further comprising recording time domain data based at least in part on the detections made with the second transceiver.

* * * * *